(12) United States Patent
Kamioka

(10) Patent No.: US 6,191,803 B1
(45) Date of Patent: Feb. 20, 2001

(54) MULTIPLE LIGHT BEAM SCANNING OPTICAL SYSTEM

(75) Inventor: Makoto Kamioka, Kasuga (JP)

(73) Assignee: Matsushita Electric Industrial Co., LTD, Osaka (JP)

( * ) Notice: Under 35 U.S.C. 154(b), the term of this patent shall be extended for 0 days.

(21) Appl. No.: 09/039,486

(22) Filed: Mar. 16, 1998

(30) Foreign Application Priority Data

Mar. 17, 1997 (JP) .................................................. 9-062655

(51) Int. Cl.[7] ......................................................... B41J 2/47

(52) U.S. Cl. ............................................ 347/235; 347/250

(58) Field of Search ................................... 347/235, 236, 347/241, 233, 237, 243, 250, 129, 134, 248, 256, 259, 260; 359/196

(56) References Cited

U.S. PATENT DOCUMENTS 4,806,951 * 2/1989 Arimoto et al. ..................... 347/235

* cited by examiner

Primary Examiner—N. Le
Assistant Examiner—Lamson D. Nguyen
(74) Attorney, Agent, or Firm—Stevens, Davis, Miller & Mosher, L.L.P.

(57) ABSTRACT

A multiple light beam scanning optical system includes a plurality of light sources, driving circuits, collimator lenses, cylindrical lenses for focusing light beams emitted from the collimator lens in sub-scanning directions, a beam splitter, and a deflector. The deflector has a deflection surface disposed near a point at which a light beam emitted from the beam splitter is focused by the cylindrical lens. A scanning lens, a synchronizing detector, and a sensor unit enable detection of position information of sub-scanning directions of the plurality of light beams. A control circuit drives and controls a cylindrical lens by processing an output signal from the sensor unit, and a light path correction mechanism moves a cylindrical lens on the basis of a control signal from the control circuit.

10 Claims, 9 Drawing Sheets

MULTIPLE LIGHT BEAM SCANNING OPTICAL SYSTEM

BACKGROUND OF THE INVENTION

1. Field of the Invention

The present invention relates to a multiple light beam scanning optical system such as an electrophotography apparatus for forming an image by scanning light beams.

2. Description of the Related Art

Heretofore, there has been used a light beam scanning optical system as an image writing device in an electrophotography process and mounted on a laser printer, a laser FAX or the like which is an output apparatus of computer and facsimile. Recently, in order to further raise a printing speed and a resolution, a demand for a scanning optical system using a plurality of light beams is increasing. A two-light-beam scanning optical system for scanning two beams meets with such demand. The two-light-beam scanning optical system according to the related art will be described hereinafter.

FIG. 10 is a perspective view showing a two-light-beam scanning optical system according to the related art. FIG. 11 is an explanatory diagram showing a space between two light beams in a sub-scanning direction (a rotation axis direction of a deflector 7 which will be described later on). FIG. 12 is an explanatory diagram showing the manner in which the space between the two light beams in the sub-scanning direction is measured by a sensor unit. FIG. 13 is a diagram of a waveform of an output signal from the sensor unit. In FIGS. 10 to 12, first and second light sources 1a, 1b emit light beams, respectively. Collimator lenses 2a, 2b collimate the light beams from the first and second light sources 1a, 1b to provide substantially parallel light beams, respectively. A prism 3 is provided to adjust a light path of a sub-scanning direction of the light beam from the second light source 1b. An adjustment mechanism 4 is provided to adjust a light path of an light beam by rotating the prism 3. A beam splitter 5 is provided to match optical axes of light beams emitted from the first and second light sources 1a, 1b. A cylindrical lens 6 is provided to focus the sub-scanning direction of the light beam emitted from the beam splitter 5. A deflector 7 has a deflection surface disposed near the focus of the cylindrical lens 6 to deflect two light beams simultaneously. A scanning lens 8 is provided to focus and scan the two light beams deflected by the deflector 7. A detection unit 9 is provided to detect a space between the two light beams in the sub-scanning direction. A synchronizing detector 10 is disposed on non-image areas of scanned light beams to synchronize the scanned light beams. Reference numeral 11 denotes a mirror for introducing light beams into a scanned surface 14. Reference numeral 12 denotes a housing. Reference numeral 13a denotes a scanned locus formed by the light beam emitted from the light source 1a. Reference numeral 13b denotes a scanned locus formed by the light beam emitted from the light source 1b. Reference numeral 15a denotes a driving circuit for driving the light source 1a. Reference numeral 15b denotes a driving circuit for driving the light source 1b. Reference numeral 16 denotes a sensor disposed in the detection unit. Reference numeral 17 denotes a deflection plane of the deflector 7.

An operation of the two-light-beam scanning optical system thus arranged according to the related art will be described below.

As shown in FIG. 10, light beams emitted from the first and second light sources 1a, 1b are collimated by the collimator lenses 2a, 2b into substantially parallel light beams. With respect to the collimated two light beams, in order to match a space between the collimated two light beams with a predetermined space, a light path of the other light beam (light beam from the first light source 1b) is adjusted by the prism 3 relative to a light path of the reference light beam (light beam from the first light source 1a). The two light beams are introduced into the beam splitter 5, in which the optical axes are substantially matched and focused in the sub-scanning direction by the cylindrical lens 6. Sine the deflection surface 17 of the deflector 7 has a very slight inclination (hereinafter this inclination will be referred to as "surface inclination") in the vertical direction of each surface, an optical conjugate relationship is established between the deflection surface 17 and the scanned surface 14 by the scanning lens 8, thereby resulting in an influence of surface inclination being alleviated.

The sub-scanning direction space of the two light beams on the deflection surface 17 affects the sub-scanning direction space on the scanned surface 14 in response to a sub-scanning direction magnification of the scanning lens 8. Accordingly, it is possible to change the space between the two light beams on the scanned surface 14 by changing the sub-scanning direction space of the two light beams incident on the deflection surface 17. As shown in FIG. 11, by rotating the prism 3 relative to the reference light beam in the sub-scanning direction, the two-light-beam space p on the deflection surface 17 is set to a predetermined space. When the prism 3 is controlled, the detection unit 9 disposed near the scanned surface 14 detects the sub-scanning direction space of the two beams, and stops the rotation of the prism 3 at the position in which the predetermined space can be achieved.

FIGS. 12 and 13 show the manner in which the sub-scanning direction space of the two light beams is measured. In FIG. 12, the sensor 16 of the detection unit 9 (FIG. 10) is a sensor having a V-shaped light-receiving surface which emits a different output signal depending upon the position of a scanned light beam. As shown in FIG. 13, for example, the output signal of the light beam which scans the upper portion of the sensor 16 has an interval longer than that of the output signal of the light beam that scans the lower portion of the sensor 16. By controlling the prism 3 through the V-shaped sensor 16, the sub-scanning direction space can be matched with the predetermined space.

In FIG. 10, although the light beam incident on the deflector 7 is deflected and focused on the scanned surface 14, the light path of the scanning optical system is generally introduced by the mirror 11 into the scanned surface 14 in order to make the optical system compact. The two light beams that are scanned by the deflector 7 are synchronized with each other in the sub-scanning direction by the synchronizing detector 10 located ahead of the position at which the image area is scanned, thereby resulting in light beams corresponding to image data being irradiated at a timing of a predetermined time. Since the scanned surface 14 is moved in the sub-scanning direction (in the direction perpendicular to the main scanning direction in which light beams are scanned), an image can be formed on the scanned surface 14 by two-dimensional light irradiation. With respect to the space between the two light beams, an interval between generated signals is changed depending upon the height in which the light beam scans. If a light path is corrected in such a manner that this signal interval becomes a predetermined interval, then it is possible to adjust the sub-scanning direction space. In this manner, the image can be formed on the scanned surface 14 by two light beams, whereby there is provided a two-light-beam scanning optical system of high speed or high resolution.

However, in the above-mentioned two-light-beam scanning optical system according to the related art, since the position of the light beam is detected by using scanned light beams, when the scanning speed is high, a quantity of light is reduced so that the level of the output signal is lowered. Moreover, since the sensing time is reduced, a detection accuracy of light beam is lowered. Further, since the position of the scanned light beam is fluctuated due to the surface inclination of the deflector 7, there is a problem that it is difficult to determine the sub-scanning direction space.

In addition to the above-mentioned system according to the related art, there is proposed a method such that a light path is corrected by detecting the beam space of the sub-scanning direction by using the light beams from the beam splitter 5 which makes light paths coincident with each other. In this case, there are arrayed two bisector sensors. When outputs from the two bisector sensors become equal to each other in level, the beam position is determined. There is then the problem that the space between the light-receiving surfaces of the bisector sensors is to be formed with a high accuracy.

Furthermore, when the light path of the sub-scanning direction space is corrected in the two-light-beam scanning optical system according to the related art, the angle of the light path is changed by using the prism 3 or the like so that the positions at which two light beams pass the scanning lens 8 become different. As a result, the scanning speed and the curvature of field on the scanned surface 14 become different. There is then the problem that an image is deteriorated.

In the two-light-beam scanning optical system, it is requested to improve the detection accuracy in the sub-scanning directions of two light beams. Also, it is requested to form an image of a high quality by eliminating errors of scanning speed and curvature of field on the scanned surface of two light beams.

Therefore, the present invention is to provide a two-light-beam scanning optical system in which the detection accuracy in the sub-scanning directions of two light beams can be improved and in which an image of a high quality can be improved by eliminating errors of scanning speed and curvature of field on the scanned surface of two light beams.

SUMMARY OF THE INVENTION

In order to solve the aforementioned problem, according to the present invention, there is provided a multiple light beam scanning optical system which comprises a plurality of light sources, driving circuits for driving the plurality of light sources independently, a plurality of collimator lenses for collimating light beams emitted from the respective plurality of light sources to provide substantially parallel light beams, a plurality of cylindrical lenses for focusing light beams emitted from the collimator lenses only in the sub-scanning direction, a beam splitter for enabling the optical axes of the light beams emitted from the cylindrical lenses to become substantially coincident with each other, a deflector having a deflection surface disposed near the focal points at which the light beams emitted from the cylindrical lenses are focused by the cylindrical lenses, a scanning lens for scanning the light beams deflected by the deflector on the scanned surface, a synchronizing detector for detecting whether or not two light beams are synchronized with each other when the beams are scanned respectively, a sensor unit for detecting position information of sub-scanning direction of the plurality of light beams at substantially equivalent position of the light beam emitted from the direction different from the direction to the deflection surface from the beam splitter, a control circuit for controlling the cylindrical lenses by processing output signals from the sensor unit, and a light path correction mechanism for moving the cylindrical lenses by a control signal from the control circuit.

Thus, there is obtained a multiple light beam scanning optical system in which a position detection accuracy in the sub-scanning direction of a plurality of light beams can be improved, and in which a difference of scanning speeds on the scanned surface of two light beams and a difference of curvatures of field can be removed, thereby making it possible to form an image of high quality.

DESCRIPTION OF THE PREFERRED EMBODIMENTS

Embodiments according to the present invention will hereinafter be described with reference to FIGS. 1 to 9.

(First embodiment)

Figure 1:
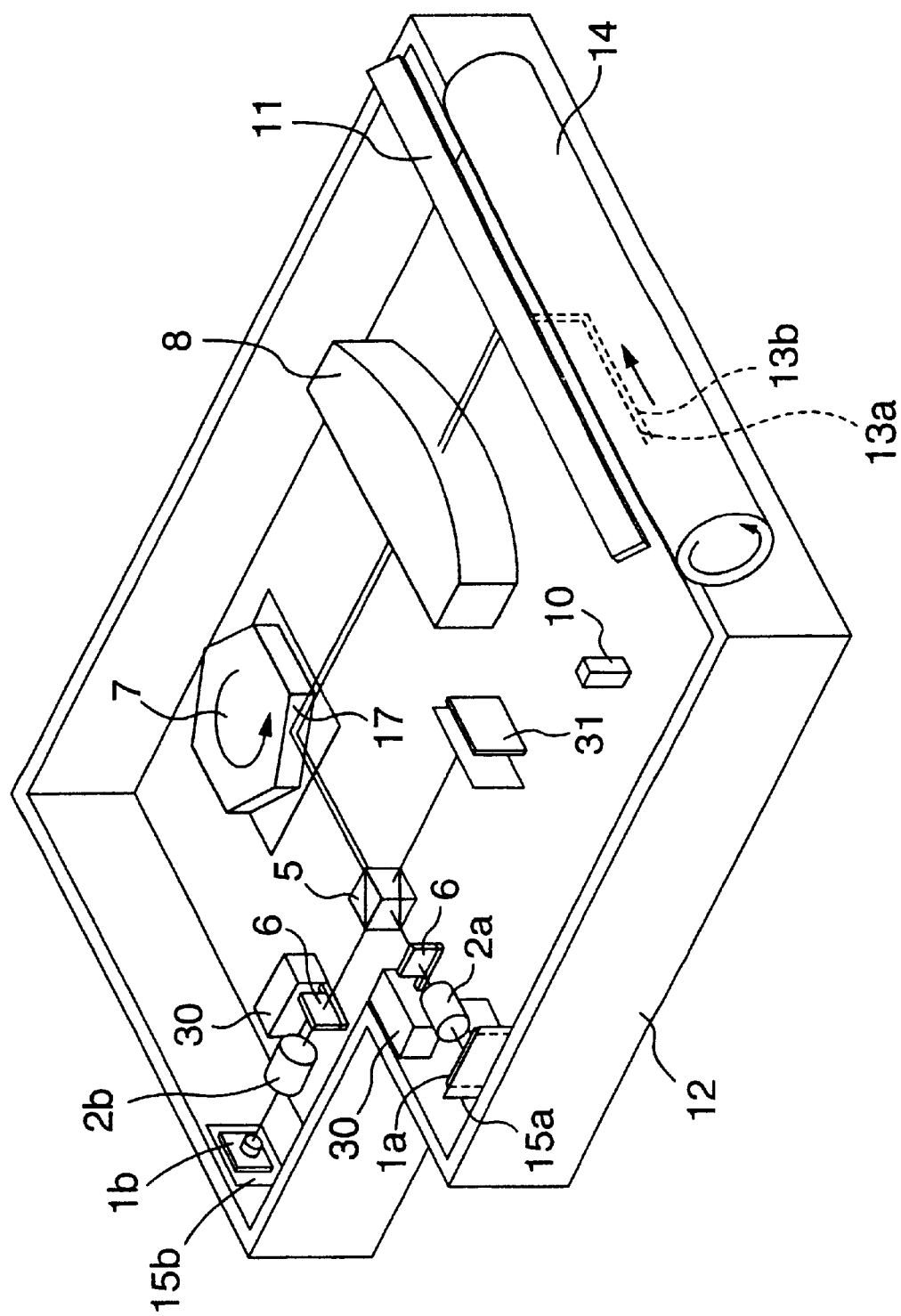
FIG. 1 is a perspective view showing a two-light-beam scanning optical system according to a first embodiment of the present invention.
Figure 10:
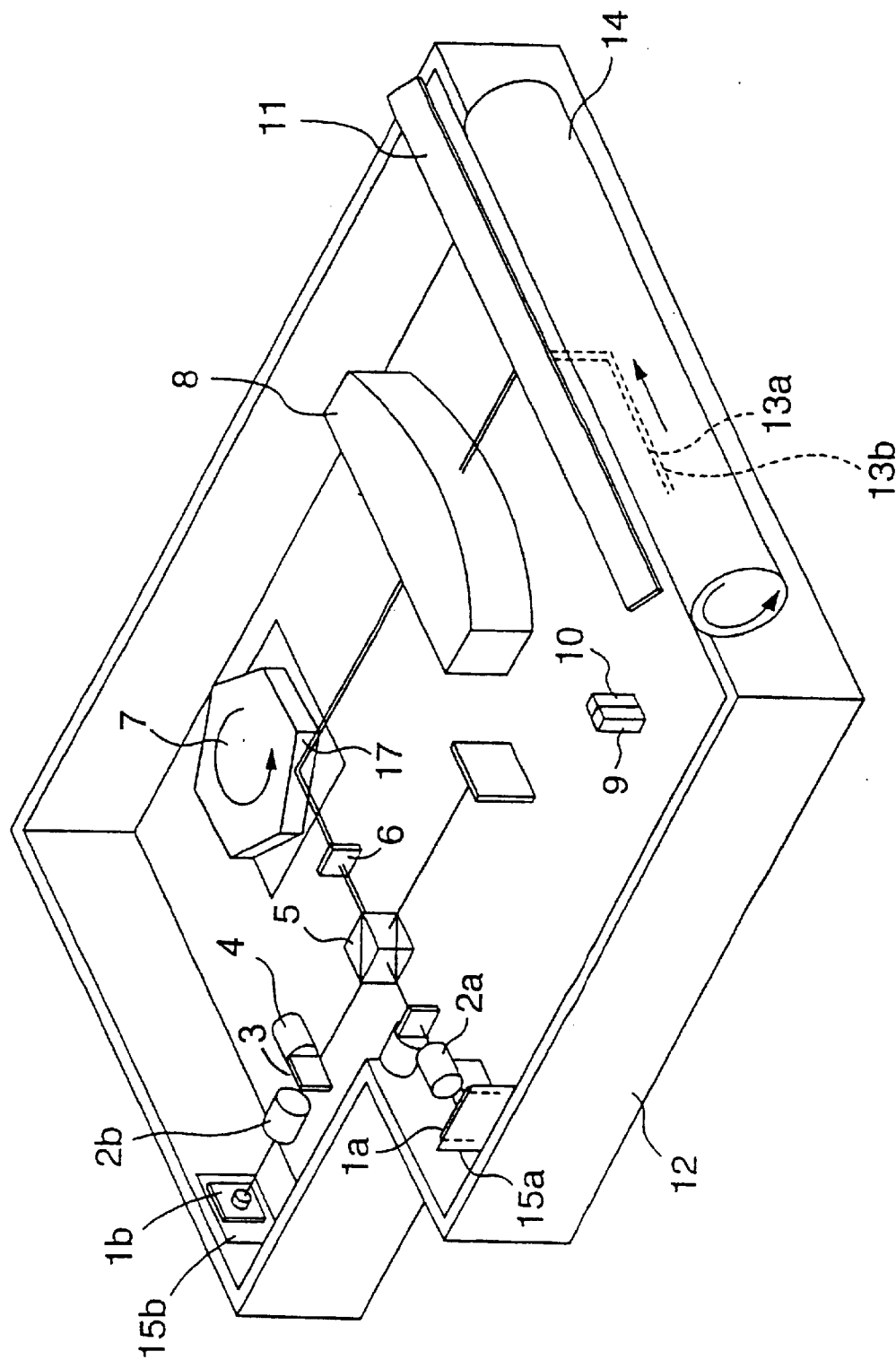
FIG. 10 is a perspective view showing a two-light-beam scanning optical system according to the related art.
Figure 11:
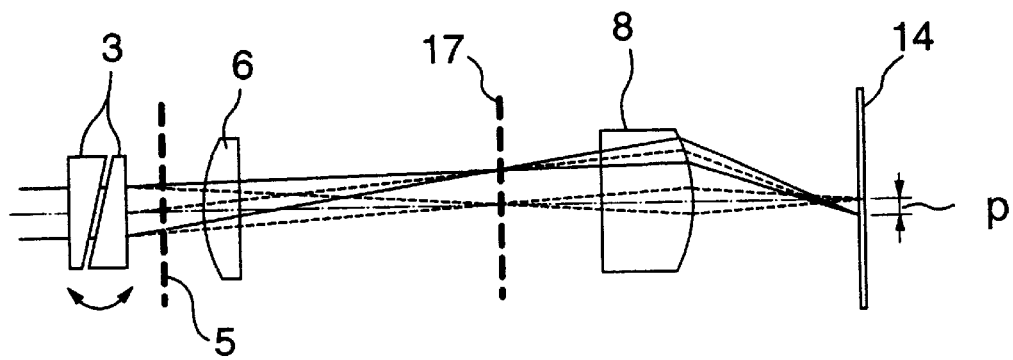
FIG. 11 is an explanatory diagram showing a space of two light beams in the sub-scanning direction.
Figure 12:
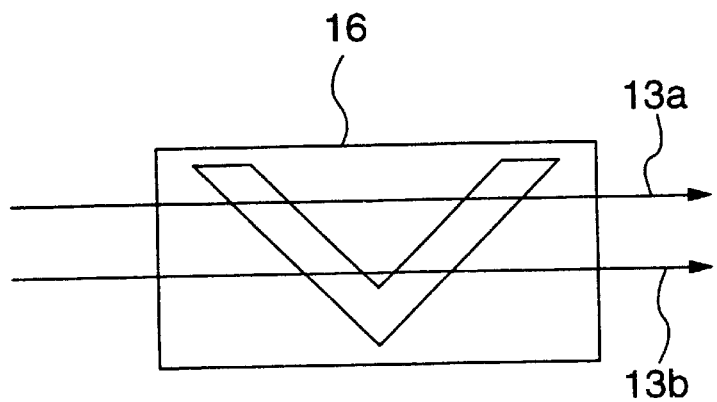
FIG. 12 is an explanatory diagram showing the manner in which a space of two light beams in the sub-scanning direction is measured by the sensor unit.
Figure 13:
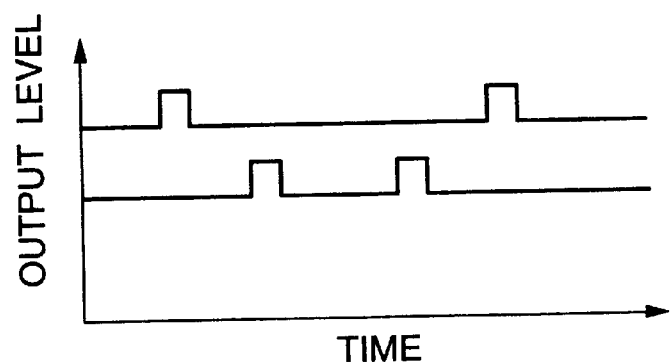
FIG. 13 is a diagram of a waveform of an output signal from the sensor unit.

FIG. 1 is a perspective view showing a two-light-beam scanning optical system according to the first embodient of the present invention. In FIG. 1, the first light source 1a, the second light source 1b, the collimator lenses 2a, 2b, the beam splitter 5, the cylindrical lens 6, the deflector 7, the scanning lens 8, the synchronizing detector 10, the mirror 11, the housing 12, the light beam 13a from the light source 1a, the light beam 13b from the light source 13b, the scanned surface 14, the driving circuits 15a, 15b, and the deflection surface 17 are similar to those of FIG. 10 and marked with the same references. In FIG. 1, reference numeral 30 denotes a light path correction mechanism, and reference numeral 31 denotes a sensor unit for matching positions of two light beams in the sub-scanning direction with each other.

Figure 2:
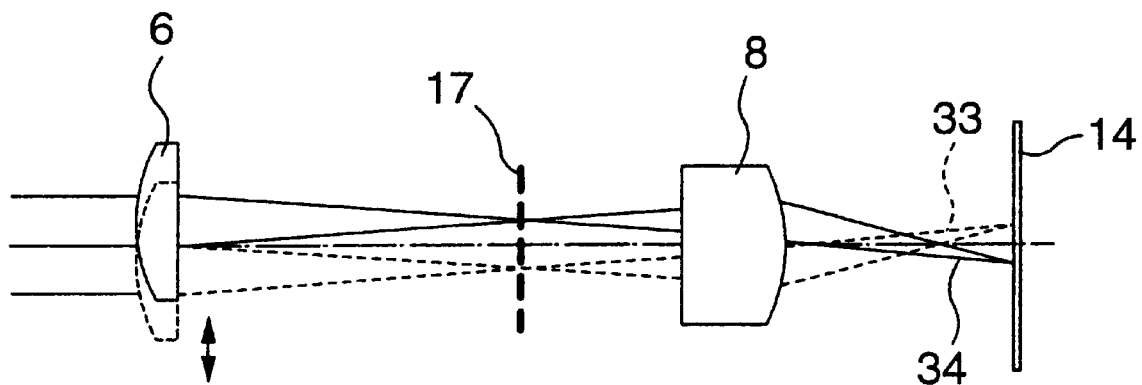
FIG. 2 is a diagram used to explain a light path, and illustrating light paths of two light beams in the multiple light beam scanning optical system shown in FIG. 1.
Figure 3:
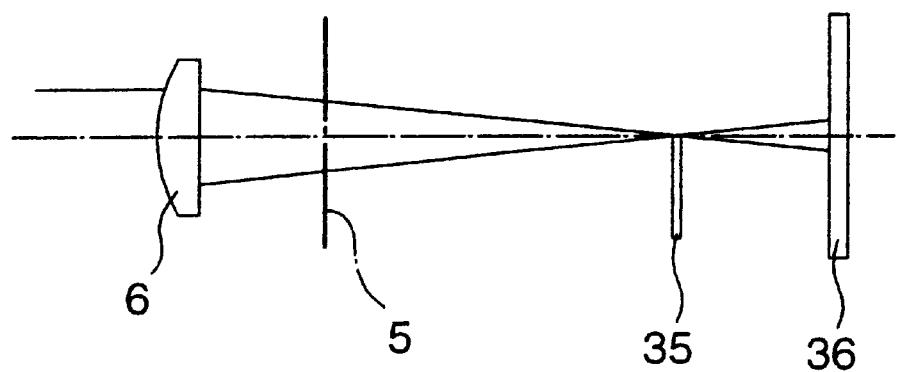
FIG. 3 is an explanatory diagram showing a light path correction sensor unit.

FIG. 2 is a diagram used to explain light paths, and showing light paths of two light beams in the two-light-beam scanning optical system shown in FIG. 1. FIG. 3 is an explanatory diagram showing a light path correction sensor unit.

In FIGS. 2 and 3, the beam splitter 5, the cylindrical lens 6, the scanning lens 8, the scanned surface 14, and the deflection surface 17 are similar to those of FIG. 1 and marked with the same references. In FIGS. 2 and 3, reference numeral 33 denotes a light path obtained before adjustment, reference numeral 34 denotes a light path obtained after adjustment, reference numeral 35 denotes a slit of a knife edge configuration. Reference numeral 36 denotes a light path correction sensor. The knife edge-shaped slit 35 and the light path correction sensor 36 comprise a sensor unit 31.

An operation of the two-light-beam scanning optical system thus arranged will be described below.

In this invention, a fundamental operation obtained when light beams are scanned is similar to that of the related art, and hence the manner in which spaces of two light beams in the sub-scanning direction are matched will be described in detail.

Initially, as shown in FIG. 1, light beams emitted from the first light source 1a are collimated by the collimator lens 2a into substantially parallel light beams, and focused by the cylindrical lens 6 only in the sub-scanning direction. One light beam is introduced through the beam splitter 5 onto the deflection surface 17, and the other light beam is deflected in the direction of the sensor unit 31.

The light beam incident on the deflection surface 17 is used to scan the scanned surface 14, and the light beam incident on the sensor unit 31 is used to detect the position of the sub-scanning direction. Since the position detection light beam is focused at the position (optical position at which beam diameter is reduced and which determines a sub-scanning direction space on the scanned surface 14) which is optically equivalent to the deflection surface, when the beam position is measured at the position in which the light beam is focused in the sub-scanning direction, then a detection accuracy can be raised. Accordingly, as shown in FIG. 3, the slit 35 of knife edge configuration is located at the focal point and the light-receiving surface of the light path correction sensor 36 is located behind the slit 35 to form the sensor unit 31, thereby making it possible to raise a detection accuracy.

The light path correction mechanism 30 focuses the light beam from the first light source 1a at the position in which a center of light beam is irradiated on the knife edge of the slit 35 of the knife edge configuration on the basis of the detection level of the sensor unit 31. The level of the output signal obtained from the sensor unit 31 at that time will be described with reference to FIGS. 4A, 4B, 4C and FIG. 5.

Figure 4A:
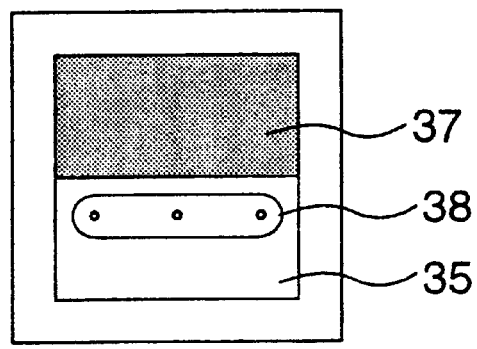
FIG. 4A is an explanatory diagram showing a relationship between a knife edge and light beam on a light-receiving surface of the light path correction sensor.
Figure 4B:
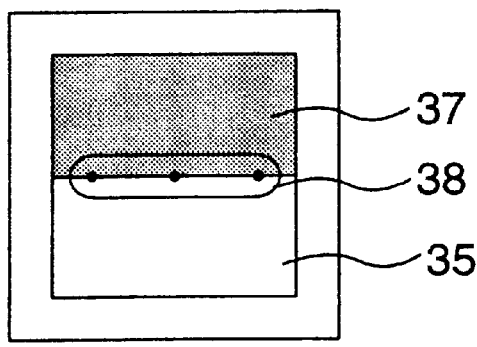
FIG. 4B is an explanatory diagram showing a relationship between a knife edge and light beam on a light-receiving surface of the light path correction sensor.
Figure 4C:
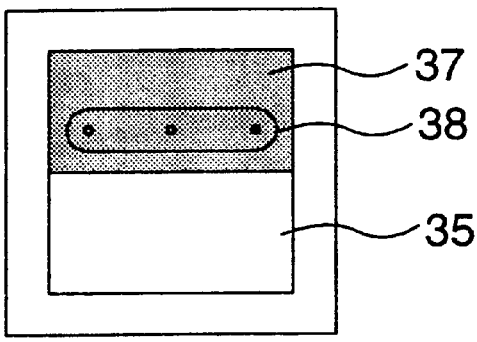
FIG. 4C is an explanatory diagram showing a relationship between a knife edge and light beam on a light-receiving surface of the light path correction sensor.
Figure 5:
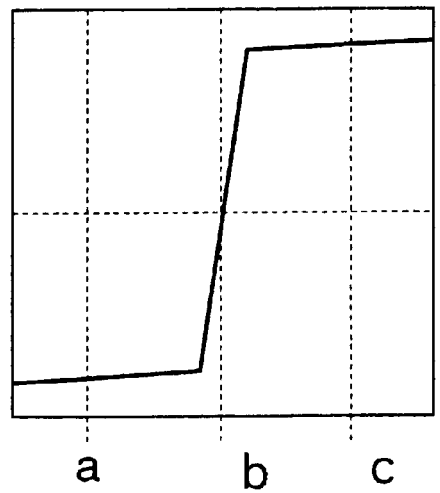
FIG. 5 is a graph showing the level of an output signal from a sensor unit.

FIGS. 4A, 4B and 4C are explanatory diagrams showing a relationship between the knife edge and light beam on the light-receiving surface of the light path correction sensor 36. FIG. 5 is a graph showing the level of the output signal from the sensor unit 31. When a light beam 38 is located at the position shown in FIG. 4A, most of light beams 38 are interrupted by the knife edge of the slit 35 of the knife edge configuration so that the sensor unit 31 outputs a low output signal level (see the level at the position a in FIG. 5). A control circuit (not shown) judges the level of the output signal from the sensor unit 31, and controls the light path correction mechanism 30 (FIG. 1) of the first light source 1a in such a manner as to move the cylindrical lens 6 in the direction in which the level of the output signal is raised. Conversely, when the light beam is located at the position shown in FIG. 4C and all light beams 38 become incident on the light-receiving surface 37, the level of the output signal from the sensor unit 31 is high (see the level at the position c in FIG. 5). The level of this output signal is judged by the control circuit, and controls the light path correction mechanism 30 for the first light source 1a in such a manner as to move the cylindrical lens 6 in the direction in which the level of the output signal is lowered.

When the center of the light beam 38 approaches the knife edge as the above-mentioned light path correction is executed, the level of the output signal from the sensor unit 31 is changed rapidly so that the light beam 38 can be focused at the position shown in FIG. 4B (see the level at the position b in FIG. 5). The position b in FIG. 5 has the output signal level located at the center position between the position a and the position c, and the position b is the position in which the center of the light beam 38 is optically located at the upper end of the knife edge. Near the position b, the output signal level is rapidly changed as the cylindrical lens 6 is moved so that the position detection accuracy is as high as within several microns.

Then, the first light source 1a is stopped from emitting light beams, and the second light source 1b is started emitting light beams. The light beam 13b from the second light source 1b also is corrected in light path in the same way as that executed when the light beam 13a from the first light source 1a is adjusted. In this fashion, the light beams 13a, 13b from the first light source 1a and the second light source 1b are focused at the same sub-scanning position. The light beam 13b from the second light source 1b is shifted by the light path correction mechanism 30 by a predetermined number of steps in the sub-scanning direction, whereby the space between the two light beams 38 is matched with a predetermined space.

As described above, the space between the light beams 38 is matched at the position equivalent to the deflection surface 17, whereby two light beams 38 having the same space as that of the light beams 38 in the sensor unit 31 are introduced into the deflection surface 17.

The scanning lens 8 is a lens configured such that a conjugate relationship may be established between the deflection surface 17 and the scanned surface 14 in the sub-scanning direction. Accordingly, the sub-scanning direction space of the light beam 38 in the deflection surface 17 is projected onto the scanned surface 14 with a magnification of the sub-scanning direction of the sub-scanning lens 8. With respect to the light beams 38 deflected from the deflection surface 17, the two light beams 38 are both parallelly introduced into the optical axis of the scanning lens 8 with a predetermined space and pass the scanning lens 8 at substantially the same positions. Therefore, it is possible to suppress a scanning speed error or a curvature of field of the two light beams 38 in the main scanning direction which tends to occur when the light beams scan the scanning lens 8 at the different pass positions.

As described above, since the center of the light beam 38 is calculated by using the focus light of the cylindrical lens 6, the light beam 38 in the sub-scanning direction is in the focused state so that the level of the output signal from the sensor 31 can be rapidly changed as the cylindrical lens 6 is moved when the position is detected.

The light beams 38 emitted from the cylindrical lens 6 are parallel to the optical axis, and hence the sub-scanning directions of the light beams 38 can be matched at any positions after the beams are emitted from the beam splitter 5. In order to raise the position detection accuracy of the light beam 38, it is preferred that the slit 35 of the knife edge configuration is located at the focal point (position equivalent to the deflection surface 17) of the cylindrical lens 6 (see FIG. 3).

A relationship between the magnitudes of the light-receiving surface 37 and the light beams 38 will be described next. When the light-receiving surface 37 of the sensor unit 31 is smaller than the incident light beam 38, the center of the light beam 38 is determined based on a quantity of light incident on the light-receiving surface 37 (see FIGS. 4A–4C). If the quantity of light incident on the light-receiving surface 37 is small, then an error between the whole light beam 38 and the center tends to occur. Therefore, when the light-receiving surface 37 of the sensor unit 31 is made larger than the diameter of the light beam 38, then the beam center position can be judged on the basis of the total quantity of light of the light beams 38, thereby making it possible to improve a position alignment accuracy. Furthermore, it is possible to alleviate an accuracy with which the sensor unit 31 is attached.

Figure 6A:
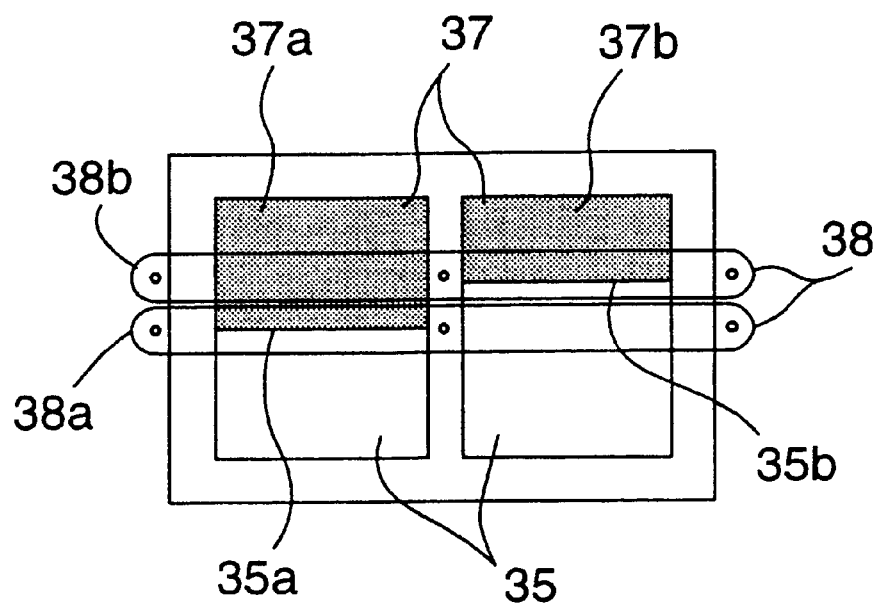
FIG. 6A is a diagram showing a sensor unit obtained when a plurality of divided sensors are disposed on the light-receiving surface of the sensor unit.
Figure 6B:
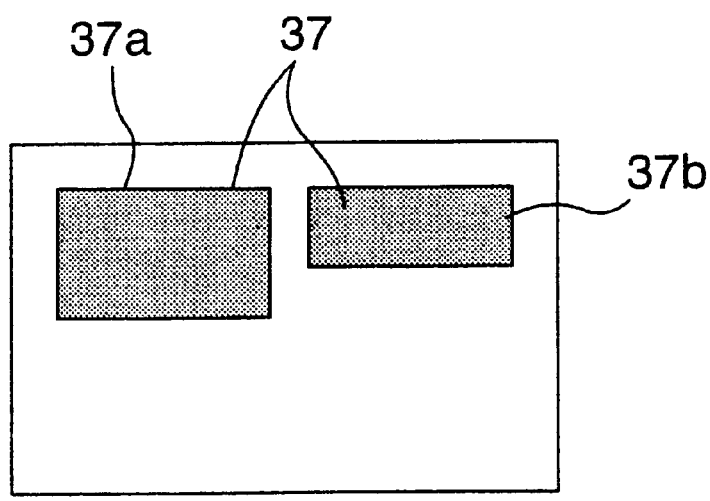
FIG. 6B is a diagram showing a sensor unit obtained when a plurality of divided sensors are disposed on the light-receiving surface of the sensor unit.

FIGS. 6A and 6B are respectively diagrams showing sensor units obtained when a plurality of divided sensors are mounted on a light-receiving surface of a sensor unit. In FIGS. 6A and 6B, reference numeral 35 denotes a slit of a knife edge shape, reference numeral 37a denotes a first divided sensor, reference numeral 37b denotes a second divided sensor, and reference numeral 38 denotes a light beam. As shown in FIG. 6A, the light-receiving surfaces 37 are arrayed on the main scanning direction, and the slit 35 which is shaped as the knife edge in accordance with the pitch of the sub-scanning direction of the light beam 38 is attached in front of the light-receiving surface 37. The slit 35 is located at the focal point of the cylindrical lens 6 as described above.

The manner in which the space between the light beams 38 in the sub-scanning direction is adjusted in the two-light-beam scanning optical system will be described. Initially, as shown in FIG. 6A, a center of a light beam 38a from the first light source 1a is matched with the knife edge 35a by using the first divided sensor 37a in the above-mentioned manner. After the light path was corrected, the first light source 1a is stopped emitting the light beam 38a. Then, a light beam 38b from the second light source 1b is matched with the knife edge 35b by using the second divided sensor 37b similarly. In the case where there are more than two light beams the function is similar to the correction of light beams 37a and 38a.

Since the distances of the knife edges in the sub-scanning direction (space between the two light beams on the deflection surface and which becomes a predetermined space on the scanned surface 14) are displaced from each other by a predetermined amount, the two light beams 38 are introduced on the deflection surface 17 by a predetermined space. When the scanning density of the sub-scanning direction, for example, is switched, when there is provided the slit 35 of the knife edge corresponding to the switched space and the sensor unit 36, then the switched space can be matched with the space of an arbitrary light beam 38.

The advantages of the method are such that the first and second divided sensors 37a, 37b can directly adjust the positions of the predetermined light beams 38 and that once the light beam 38 is matched with the same sub-scanning position, the light path correction mechanism 30 need not shift the light beam 38 by a predetermined number of steps. While there is provided the slit 35 of the knife edge as described above, the present invention is not limited thereto, and the light-receiving surfaces 37 of the first and second divided sensors 37a, 37b may be shaped in the same manner as that of the knife edge-shaped slit 35 as shown in FIG. 6B.

The control operation executed by the light path correction mechanism 30 by using the knife edge will be described next. The manner in which the center of the light beam 38 is matched with the knife edge by using the knife edge will be described below. The light path correction sensor 36 (FIG. 3) is a photo-diode which monitors an output of a quantity of light.

For example, the output signal level (output signal level based on a quantity of light which is a half of the total quantity of light) of the sensor unit 31 obtained when the light beam 38 is irradiated on the position (position b in FIG. 5) shown in FIG. 4B is determined previously. When the output signal level is lower than this output signal level, then the control circuit (not shown) outputs an output level "L" (low level). When on the other hand the output signal level is higher than this output signal level, then the control circuit outputs an output level "H" (high level). When the position of the initial light beam 38 is set, the light beam 38 is adjusted so as to establish the "H" level. When the output is held at the "H" level, then the cylindrical lens 6 is moved by driving the light path correction mechanism 30 in such a manner that the light beam 38 is shifted in the knife edge direction (direction in which the light beam is interrupted). At the time point the output level of the control circuit changes from "H" (high level) to "L" (low level), the movement of the cylindrical lens 6 is stopped. When it is determined whether or not the output level of the control signal is changed from "H" level to "L" level, when the output signal level of the sensor unit 31 is sampled several times, then it is possible to prevent the control circuit from mal-functioning due to a noise. Conversely, when the position of the initial light beam 38 is set in such a manner that the output level of the control circuit goes to "L" level, the cylindrical lens 6 is moved in the direction opposite to the direction presented when the output level of the control circuit is held at "H" level.

The description of the manner in which the center of the light beam 38 is matched with the knife edge will be ended.

When the sub-scanning direction space between the two light beams 38 is adjusted by one light-receiving sensor such as the photo-diode, the position of the sub-scanning direction is once set to the two light beams 38 in advance. Then, by moving the cylindrical lens 6 which corresponds to any of the two light beams 38 by a predetermined number of steps under control of the light path correction mechanism 30, the sub-scanning direction spaces on the deflection surface 17 can be matched. To be concrete, initially, one light beam 38 is adjusted by the light path correction mechanism 30 in such a manner that the center of the beam coincides with the knife edge on the sensor unit 31. Also, the other light beam 38 also is matched similarly by the knife edge. In this way, the centers of the beams in the sub-scanning direction of the two light beams are matched with each other. Thereafter, when any one of the light beams 38 is moved by the light path correction mechanism 30 by a predetermined number of steps, then the sub-scanning direction space between the two light beams 38 can be adjusted arbitrarily.

Figure 7:
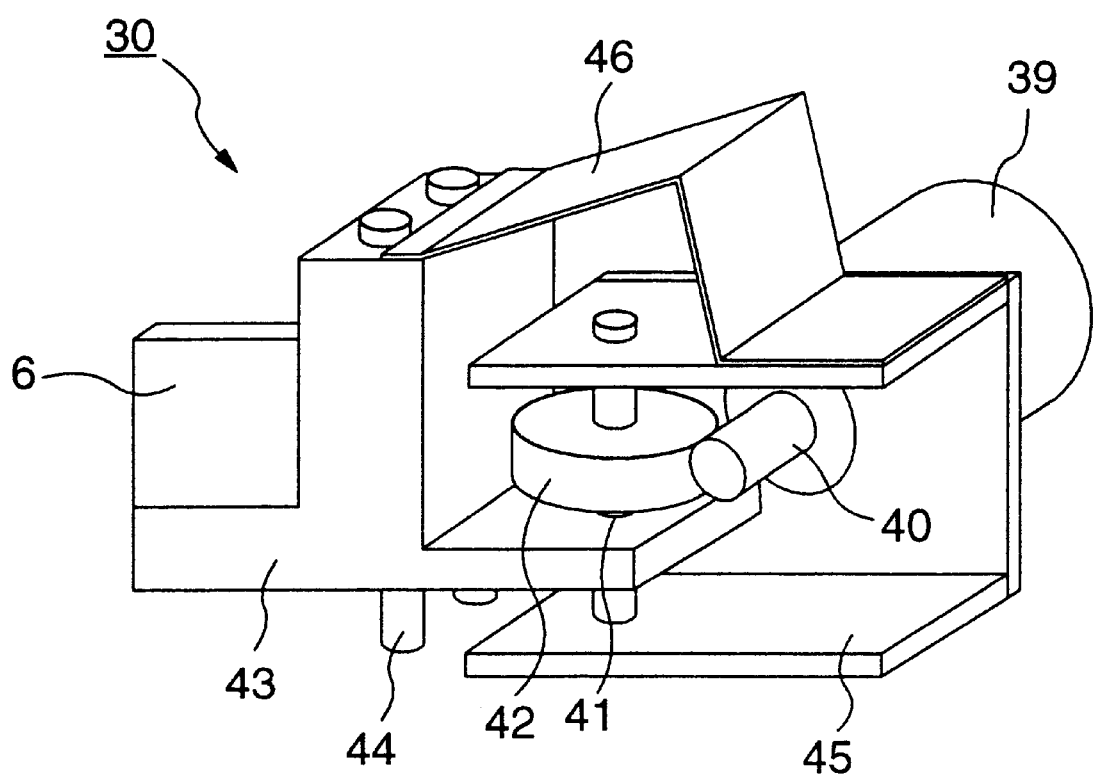
FIG. 7 is a perspective view showing in detail a light path correction mechanism comprising a two-light-beam scanning optical system according to the first embodiment of the present invention.

FIG. 7 is a perspective view showing in detail the light path correction mechanism 30 comprising the two-light-beam scanning optical system according to the embodiment of the present invention. In FIG. 7, reference numeral 6 denotes the cylindrical lens, reference numeral 39 denotes a motor, reference numeral 40 denotes a worm gear, 41 denotes a shaft, reference numeral 42 denotes a worm wheel, reference numeral 43 denotes a lens holder for holding the cylindrical lens 6, reference numeral 44 denotes a guide pin, reference numeral 45 denotes a base, and reference numeral 46 denotes a leaf spring.

As described above, the light path correction mechanism 30 transmits a drive force by the gears. When the gears are rotated in a constant direction, the gears are meshed with each other so that the gears have hardly backlash. Hence, the light correction mechanism 30 can transmit the drive force in accordance with the steps indicated by the output signal from the control circuit. However, when the gears are rotated in the reverse direction from a certain constant direction, the gears that have been meshed with each other cannot be moved by the amount of the backlash of the gear. Although the gears can be manufactured in such a manner that they hardly have the backlash, there is then the problem from a standpoint of cost and mass-production.

Accordingly, even when the gear of the light path correction mechanism 30 has the backlash, it is necessary to eliminate the influence of the backlash. To this end, immediately before the center of the light beam 38 is matched with the knife edge of the sensor unit 31, the light path correction mechanism 30 is driven in the direction in which the gear is rotated, whereby the sub-scanning direction space between the two light beams 38 is matched with a predetermined space. To this end, the direction in which the light beam 38 is positioned may be constantly set in the constant direction in advance.

Specifically, when the center of the light beam 38 is matched with the knife edge, initially, the cylindrical lens 6 is moved by the light path correction mechanism 30 to the position at which substantially whole diameters of two light beams 38 are irradiated on the sensor unit 31. Then, the positions of the two light beams 38 are adjusted from that position, and one of the light beam 38 is shifted from the adjusted position to the knife edge side by a predetermined number of steps. That is, the direction in which one light beam 38 is moved becomes the same direction of the movement direction, thereby resulting in the influence of the backlash being eliminated. As described above, the light path correction mechanism 30 is driven by a predetermined number of steps under control of the driving in the same direction, whereby a movement amount of the light path correction mechanism 30 owing to the backlash of the gear can be maintained, thereby making it possible to obtain a space of high accuracy.

Moreover, the light path correction mechanism 30 shown in FIG. 7 is formed as a unit, and may be inserted into a guide pin 44 provided on the housing 12 of the two-light-beam scanning optical system. The position of the cylindrical lens 6 is determined by a reference pin and a rotary pin of the guide pin 44. According to the above-mentioned arrangement, the two-light-beam scanning optical system can be assembled with ease.

The manner in which a light damage on the scanned surface 14 is reduced will be described next. When the sub-scanning direction spacing between the two light beams is adjusted, the light beams 38 are introduced by the beam splitter 5 both into the sensor unit 31 and the deflector 7. Accordingly, the light beam 38 is irradiated on the scanned surface 14 during the light beam 38 is irradiated on the sensor unit 31 for adjustment, whereby the scanned surface 14 may be damaged. In order to prevent the scanned surface 14 from being damaged, when the space between the two light beams 38 is adjusted, the deflector 7 is driven. When the deflector 7 is driven, the light beam 38 irradiated on the deflection surface 17 scans the scanned surface 14 thereby to diffuse the irradiation of the light beam 38 on the scanned surface 14. Thus, it is possible to prevent the scanned surface 14 from being damaged when the light beam 38 is concentrated at one point.

Then, the manner of preventing the sensor unit 31 from being damaged by the light beam 38 will be described. After the two light beams 38 are made coincident with each other in the sub-scanning direction under adjustment, the respective light beams 38 are moved in the direction in which the light-receiving surface 37 is covered with the knife edge of the slit 35 of the knife edge shape. It is natural that the number of steps for adjusting one light beam 38 and the other light beam 38 of the two light beams 38 to have a predetermined space of the light beam 38 in the sub-scanning direction is different. According to the above-mentioned arrangement, since the light beam 38 irradiated on the sensor unit 31 is interrupted by the knife edge of the slit 35 of the knife edge shape, thereby making it possible to prevent the sensor unit 31 from being damaged by the light beam 31. Moreover, a new light-shielding member need not be added.

The manner in which the control circuit for driving and controlling the light path correction mechanism 30 can be simplified will be described next. The adjustment of the sub-scanning direction space between the two light beams is effected on each one of the light beams from the two light sources. Accordingly, even though the light path correction mechanism 30 is required at every beam, it is sufficient to provide one control circuit. In this case, when a selector for switching signal lines through which signals are supplied to each light path correction mechanism 30 is mounted on the control circuit, then the control circuit can be made common, whereby the two-light-beam scanning optical system can be reduced in cost and the control circuit can be miniaturized.

As described above, according to the embodiment of the present invention, since the position of the light beam 38 in the sub-scanning direction is detected at the position equivalent to the deflection surface so that the light path can be moved in the sub-scanning direction of the cylindrical lens 6, the corrected light path of the light beam 38 is introduced into the scanning lens 8 without being inclined in the sub-scanning direction and the respective light beams 38 pass substantially the same position of the scanning lens 8, thereby preventing a difference of scanning speed and a difference of curvature of field from being caused on the scanned surface 14.

Also, Since the output signal level of the sensor unit 31 can be rapidly changed near the center of the light beam 38 by using the knife edge to measure the position of the light beam 38, it is possible to detect the center of the light beam 38 with a high accuracy.

Further, since the light path correction sensor 36 includes the light-receiving surface 37 of which the diameter is larger than that of the light beam 38 to detect the center of the light beam 38 by the whole of the incident light beam 38, the accuracy with which the position of the light beam 38 is detected can be improved.

Further, since the sensor unit 31 includes two light-receiving sensors, the sub-scanning direction space between the two light beams 38 can be corrected by using the two light-receiving sensors corresponding to a predetermined space, and the sub-scanning direction space can be corrected at a high speed.

Further, since the light path correction mechanism 30 is controlled in such a manner that the level of the output signal from the sensor unit 31 changes from small to large level or from large to small level, it is possible to digitally determine on the basis of the output signal from the sensor unit 31 the direction in which the cylindrical lens 6 should be moved.

Further, since the positions of the two light beams 38 in the sub-scanning direction are made coincident with each other on the basis of the output signal from the sensor unit 31 and any one of the two cylindrical lenses 6 is moved by a predetermined number of steps, whereby one sensor unit 31 can correct the sub-scanning direction space between the two light beams 38 into an arbitrary space in response to the number of steps.

Further, since the positions of the two light beams 38 in the sub-scanning direction are made coincident with each other on the basis of the output signal from the sensor unit 31 and the direction in which any one of the two cylindrical lenses 6 is moved by a predetermined number of steps is the same as the direction in which the cylindrical lens 6 is moved by the light path correction mechanism 6 just before, it is possible to reduce a movement amount error caused when the cylindrical lens 6 is moved in actual practice due to the backlash of the gear in the mechanism which moves the cylindrical lens 6.

Further, since the light path correction mechanism 30 is of the unit type, the assembly process of the two-light-beam scanning optical system can be made easy.

Further, when the sub-scanning direction space between the two light beams 38 is adjusted by the sensor unit 31, the deflector 7 is driven to enable the incident light beams 38 to scan the scanned surface 14. Thus, it is possible to prevent the light beams 38 from the light source from being concentrated on a certain one portion of the scanned surface 14 through the deflector 7 during the light path is being corrected.

Furthermore, after the sub-scanning directions of the two light beams 38 were detected by the sensor unit 31, the cylindrical lens 6 is moved by the light path correction mechanism 30 by a predetermined number of steps in the knife edge direction, whereby the light beams 38 to the sensor unit 31 can be shielded without the light-shielding member.

Furthermore, since the control circuit includes the selector for switching over the signal lines for transmitting a signal to the respective light path correction mechanism 30, the control circuit can be made common, the two-light-beam scanning optical system can be reduced in cost, and the control circuit can be miniaturized.

(Second embodiment)

Figure 8:
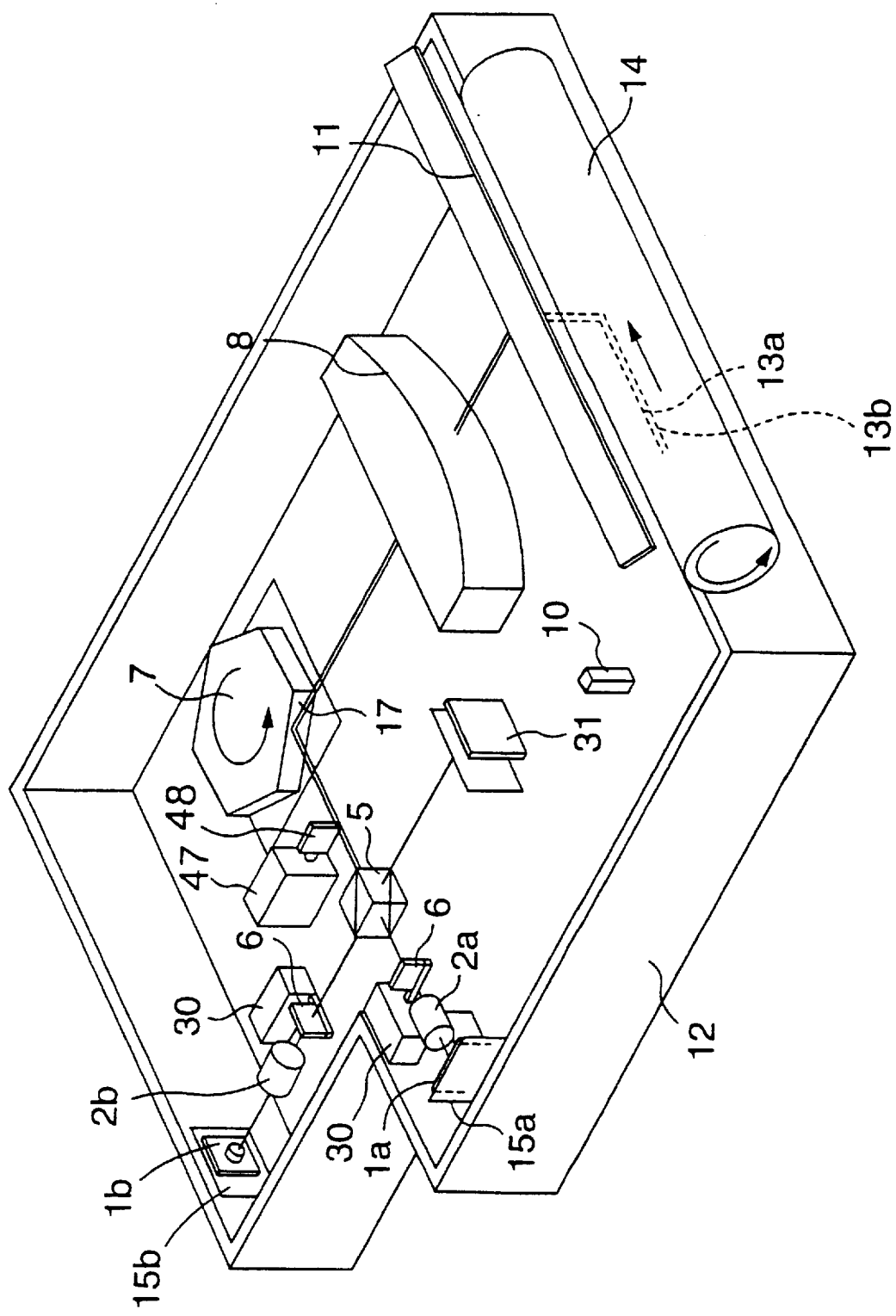
FIG. 8 is a perspective view showing a multiple light scanning/optical system according to a second embodiment of the present invention.

FIG. 8 is a perspective view showing a two-light-beam scanning optical system according to a second embodiment of the present invention. In FIG. 8, the first light source 1a, the second light source 1b, the collimator lenses 2a, 2b, the beam splitter 5, the cylindrical lens 6, the deflector 7, the scanning lens 8, the synchronizing detector 10, the mirror 11, the housing 12, the light beam 13a from the first light source 1a, the light beam 13b from the second light source 1b, the scanned surface 14, the driving circuits 15a, 15b, the deflection surface 17, the light path correction mechanism 30 and the sensor 31 are identical to those of FIG. 1. In FIG. 8, reference numeral 47 denotes an actuator, and reference numeral 48 denotes a light-shielding plate.

An operation of the two-light-beam scanning optical system thus arranged will be described below.

When the sub-scanning direction space between the two light beams 38 is adjusted, the actuator 47 enables the light-shielding plate 48 to be interposed between the beam splitter 5 and the deflector 7, thereby resulting in the light path of the light beams 38 to the deflection surface 17 being interrupted. According to the above-mentioned arrangement, since the light path of the light beam 38 to the deflection surface 17 is completely shielded by the light-shielding plate 48 during the light beam 38 is irradiated on the sensor unit 31 in order to adjust the sub-scanning direction space between the two light beams 38, it is possible to prevent the scanned surface from being damaged by the light beam 38.

(Third embodiment)

Figure 9:
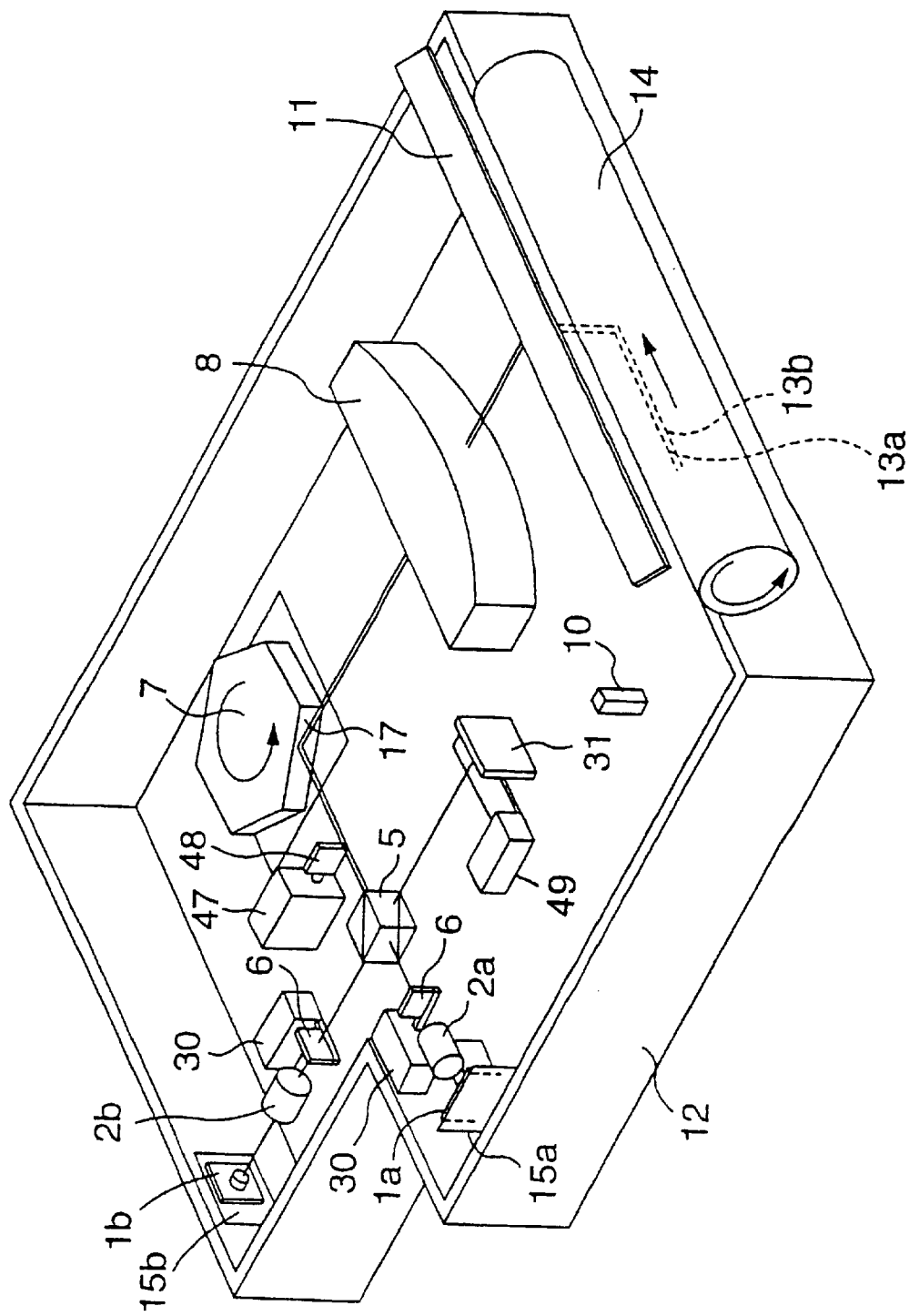
FIG. 9 is a perspective view showing a two-light-beam scanning optical system according to a third embodiment of the present invention.

FIG. 9 is a perspective view showing a two-light-beam scanning optical system according to a third embodiment of the present invention. In FIG. 9, the first light source 1a, the second light source 1b, the collimator lenses 2a, 2b, the beam splitter 5, the cylindrical lens 6, the deflector 7, the scanning lens 8, the synchronizing detector 10, the mirror 11, the housing 12, the light beam 13a from the first light source 1a, the light beam 13b from the second light source 1b, the scanned surface 14, the driving circuits 15a, 15b, the deflection surface 17, the light path correction mechanism 30, the sensor unit 31, the actuator 47, and the light-shielding plate 48 are identical to those of FIG. 1. In FIG. 9, reference numeral 49 denotes a slit movement mechanism.

An operation of the two-light-beam scanning optical system thus arranged will be described below.

During the printing operation after the two light paths were corrected, the beam splitter 5 causes the light beams 38 to be irradiated on the sensor unit 31. As a result, the light-receiving surface 37 of the sensor unit 31 is damaged by light, and hence the level of the output signal from the sensor unit 31 is changed when two light beams are adjusted, thereby resulting in the position alignment accuracy being lowered or thereby resulting in the deterioration of the sensor unit 31 being hastened. As a consequence, a life span of the sensor unit 31 is shortened.

In order to solve the aforementioned problem, only when the two light beams 38, for example, are adjusted, the light path to the sensor unit 31 is released by using the slit movement mechanism 49 which moves the light-shielding plate 48 between the beam splitter 5 and the sensor unit 31. In this case, the arrangement may be the arrangement comprising the actuator 47 and the light-shielding plate 48 shown in FIG. 8. After the two light beams 48 were adjusted, the light-shielding plate 48 is returned to the predetermined position one more time, thereby resulting in the light path being interrupted. Thus, it is possible to prevent the sensor unit 31 from being damaged by the light beams 38.

The manner in which the slit movement mechanism 49 moves the slit 35 of the knife edge shape to thereby prevent the sensor unit 31 from being damaged by the light beams 38 will be described next.

Initially, the light beam 13a is irradiated from the first light source 1a, and the slit 35 of the knife edge shape is elevated and lowered by the slit movement mechanism 49, whereby the position of the light beam 13a from the first light source 1a is judged at the position in which the level of the output signal from the sensor unit 31 becomes the center of the light beam 38.

Then, the slit 35 of the knife edge shape is moved by the number of steps such that a predetermined sub-scanning direction space is established relative to the light beam 13a from the first light source 1a. At this position, the cylindrical lens 6 is moved by the light path correction mechanism 30 in such a manner that the center of the light beam 13b from the second light source 1b coincides with the knife edge. After the position adjustment of the sub-scanning direction of the two light beams 38 was finished, the slit movement mechanism 49 shields the light beams 38 from being irradiated on the light-receiving surface 37 of the sensor unit 31.

According to the above-mentioned arrangement, the light beams 38 onto the sensor unit 31 which is placed in the printing mode are interrupted by the slit movement mechanism 49. When the light beams are adjusted, the slit movement mechanism 49 returns the light-shielding plate 48 to the predetermined position to allow the light beams 38 to become incident on the sensor unit 31. Thus, it is possible to prevent the sensor unit 31, which is set to the printing mode, from being damaged by the light beams 38.

Further, since the slit 35 of the knife edge shape is elevated and lowered by the slit movement mechanism 49, the slit 35 of the knife edge shape can be used to adjust the positions of the two light beams 38 and to shield the light beams 38, thereby preventing the sensor unit 31 from being damaged by light beams.

Furthermore, since it is sufficient that the light path correction mechanism 30 adjusts only the light beam 13b from the second light source 1b, only one light path correction mechanism 30 is sufficient.

As described above, according to the multiple light beam scanning optical system of the present invention, since the position of the light beam in the sub-scanning direction is executed at the position equivalent to the deflection surface and the light path is shifted in the sub-scanning direction of the cylindrical lens, the light path presented after the light beam was corrected becomes incident on the scanning lens without being inclined in the sub-scanning direction, and hence the respective light beams can pass substantially the same position of the scanning lens. There is then achieved the effect that an error of scanning speed on the scanned surface and an error of curvature of field are difficult to occur.

Since the sensor unit includes the light-receiving sensor such as the photo-diodes and the knife edge-shaped slit disposed in front of the light-receiving sensor at the position equivalent to the distance from the beam splitter to the deflection surface, the whole diameter of the light beam can be irradiated on the light-receiving sensor and the whole diameter of the light beam can hardly be irradiated on the light-receiving sensor. Also, since the light beam is focused by the knife edge, the sensor output is rapidly changed near the center of the light beam. There is achieved the effect that the center of the light beam can be detected with a high accuracy.

Further, since the sensor unit includes the light-receiving surface larger than the light beam irradiated on the light-receiving sensor, the center of the light beam can be detected by using the whole diameter of the light beam. There is then achieved the effect that the position detection accuracy of the light beam can be improved.

Further, since the sensor unit includes a plurality of light-receiving surfaces, a plurality of light-receiving surfaces are arranged in the horizontal direction and a plurality of light-receiving surfaces arranged in the horizontal direction include slits of knife edge shape corresponding to the predetermined space between two light beams in the sub-scanning direction on the scanned surface or a plurality of light-receiving surfaces arranged in the horizontal direction have configurations equivalent to the slit, the sub-scanning direction space between the two light beams can be corrected by using each sensor corresponding to the predetermined space. There is then achieved the effect that the space between the two light beams in the sub-scanning direction can be corrected at a higher speed.

Further, since the control circuit controls the light path correction mechanism on the basis of two values obtained when the output signal level of the sensor unit is smaller than the predetermined value and larger than the predetermined value in such a fashion that the level changes from small to large level or from large to small level, the direction in which the cylindrical lens should be moved is digitally determined based on the output signal from the sensor unit. Also, since the point at which the output signal level of the sensor unit changes becomes the center of the light beam, there is achieved the effect that the light path can be corrected with a high accuracy.

Further, the control circuit makes the sub-scanning direction positions of the two light beams coincident with each other on the basis of the output signal from the sensor unit and shifts the two cylindrical lenses by a predetermined number of steps. There is then achieved the effect that the sub-scanning direction space between the two light beams can be corrected into an arbitrary space by one sensor unit in response to the number of steps.

Further, since the control circuit makes the sub-scanning direction positions between the two light beams coincident with each other on the basis of the output signal from the sensor unit and the direction in which either one of the two cylindrical lenses is shifted by a predetermined number of steps is the same direction as the direction in which the cylindrical lens is shifted by the light path correction mechanism just before. There is then achieved the effect that the error caused in the actual movement amount of the cylindrical lens due to the backlash of the gear in the mechanism which moves the cylindrical lens can be reduced.

Further, when the sub-scanning direction space between the two light beams is adjusted by the sensor unit, the deflector causes the incident light beams to scan the scanned surface to thereby prevent the light beams from being concentrated on a certain one portion of the scanned surface through the deflector during the light path is corrected. There is then achieved the advantageous effect that the scanned surface can be prevented from being deteriorated.

Further, when the sub-scanning direction space between the two light beams is adjusted by the sensor unit, since the two-light-beam scanning optical system includes the light-shielding plate for shielding the light path from the light source to the deflector, the light beams from the light source can be prevented from being concentrated on a certain one portion of the scanned surface through the deflector during the light path is corrected. There is then achieved the effect that the scanned surface can be prevented from being deteriorated.

Further, since the two-light-beam scanning optical system includes the light-shielding plate movement mechanism for shielding the light beams from being irradiated on the sensor unit except when the sub-scanning direction space between the two light beams is adjusted by the sensor unit, the light beams can be prevented from being irradiated on the sensor unit even after the adjustment of the sub-scanning direction space between the two light beams was finished. There is then achieved the effect that the sensor unit can be prevented from being deteriorated.

Further, after the sub-scanning directions of the two light beams are detected by the sensor unit, the control circuit controls the light path correction mechanism in such a manner that the cylindrical lens is move by a predetermined number of steps in the direction of the slit of knife edge shape to thereby shield the light beams onto the sensor unit. There is then achieved the effect that the sensor unit can be prevented from being deteriorated.

Further, since the two-light-beam scanning optical system includes the slit movement mechanism which is movable in front of the light-receiving surface of the sensor unit, the optical beams onto the sensor unit can be shielded and the sensor unit can be prevented from being deteriorated. Also, there is then achieved the advantage that the sub-scanning direction space between the two light beams can be adjusted.

Further, the control circuit includes the slit movement mechanism to move the slit of knife edge shape of the sensor unit to the reference position and the light path correction mechanism to adjust the light path such that one light path of two light beams becomes the center of the light beam at the knife edge. Then, the knife edge is moved by the slit movement mechanism by the number of steps corresponding to the space between the light beams, and the light path correction mechanism is used to adjust the light path in such a manner that the center of the light beam of the other light path coincides with the position of the moved knife edge. Thus, the sub-scanning direction space of the other light beam can be adjusted to the predetermined value relative to one light beam of which the light path is fixed. There is then achieved the advantageous effect that the two light beams need not be matched with the sub-scanning direction simultaneously.

Further, the control circuit includes the slit movement mechanism to move the slit of knife edge shape of the sensor unit to the reference position and the light path correction mechanism to adjust the light path such that one light path of two light beams becomes the center of the light beam at the knife edge. Then, the knife edge is moved by the slit movement mechanism by the number of steps corresponding to the space between the light beams, and the light path correction mechanism is used to adjust the light path in such a manner that the center of the light beam of the other light path coincides with the position of the moved knife edge. Thus, the slit movement mechanism moves the slit of the knife edge shape to the position such that the two light beams can be prevented from being irradiated on the sensor unit. As a result, since the light beams are prevented from being irradiated on the sensor unit after the sub-scanning direction space between the two light beams was adjusted, there is achieved the advantageous effect that the sensor unit can be prevented from being deteriorated.

Further, when the sub-scanning direction space between the two light beams is adjusted by the sensor unit, the deflector causes the incident light beams to scan the scanned surface. There is then achieved the advantageous effect that, when the sub-scanning direction space between the two light beams is adjusted, an image is prevented from being deteriorated due to the irradiation of the light beams onto the scanned surface.

Furthermore, when the sub-scanning direction space between the two light beams is adjusted by the sensor unit, the two-light-beam scanning optical system includes the light-shielding plate for shielding the light path from the beam splitter to the deflector. There is then achieved the advantageous effect that, when the sub-scanning direction space between the two light beams is adjusted, an image is prevented from being deteriorated due to the irradiation of the light beams onto the scanned surface without operating the deflector.

Furthermore, since the control circuit shares the control of the light path correction mechanisms corresponding to the two light sources, there is achieved the advantageous effect that the control circuit can be simplified.

Furthermore, since each of the light path correction mechanism and the slit movement mechanism includes the unit comprised of the stepping motor, the reduction gear and the lens holder and the housing for positioning the unit, there is achieved the advantageous effect that the assembly process of the two-light-beam scanning optical system can be simplified.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A multiple light beam scanning optical system comprising:

a plurality of light sources;

driving circuits for independently driving said plurality of light sources;

a plurality of collimator lenses for collimating light beams from said plurality of light sources to provide a plurality of substantially parallel light beams, respectively;

a plurality of cylindrical lenses for focusing respective light beams emitted from said plurality of collimator lenses only in a sub-scanning direction;

a beam splitter for making optical axes of light beams emitted from said cylindrical lenses coincident with each other;

a deflector having a deflection surface near a point at which the light beams emitted from said beam splitter are focused by said cylindrical lenses;

a scanning lens for scanning the light beams deflected by said deflector on a scanned surface;

a synchronizing detector for detecting whether or not said light beams are synchronized with each other when the light beams are respectively scanned on said surface;

a sensor unit for detecting position information of the sub-scanning direction of said light beams at a position substantially equivalent to said deflector from a light beam emitted in a direction different from a direction that said beams travel from said beam splitter to said deflection surface;

a control circuit for driving and controlling at least one of said cylindrical lenses by processing an output signal from said sensor unit; and a light path correction mechanism for moving said at least one of said cylindrical lenses on the basis of a control signal from said control circuit, wherein:

said control circuit controls said light path correction mechanism such that said light path correction mechanism causes positions of said light beams to coincide with each other in response to said position information of the sub-scanning direction of said light beams sensed by said sensor unit and moves ones of said light beams in a sub-scanning direction thereof relative to a particular one of said light beams.

2. A multiple light beam scanning optical system comprising:

a plurality of light sources;

driving circuits for independently driving said plurality of light sources;

a plurality of collimator lenses for collimating light beams from said plurality of light sources to provide a plurality of substantially parallel light beams, respectively;

a plurality of cylindrical lenses for focusing respective light beams emitted from said plurality of collimator lenses only in a sub-scanning direction;

a beam splitter for making optical axes of light beams emitted from said cylindrical lenses coincident with each other;

a deflector having a deflection surface near a point at which the light beams emitted from said beam splitter are focused by said cylindrical lenses;

a scanning lens for scanning the light beams deflected by said deflector on a scanned surface;

a synchronizing detector for detecting whether or not said light beams are synchronized with each other when the light beams are respectively scanned on said surface;

a sensor unit for detecting position information of the sub-scanning direction of said light beams at a position substantially equivalent to said deflector from a light beam emitted in a direction different from a direction that said beams travel from said beam splitter to said deflection surface;

a control circuit for driving and controlling at least one of said cylindrical lenses by processing an output signal from said sensor unit;

a light path correction mechanism for moving said at least one of said cylindrical lenses on the basis of a control signal from said control circuit; and a slit movement mechanism which is movable in front of the light-receiving surface of said sensor unit.

3. A multiple light beam scanning optical system, comprising:

a plurality of light sources;

driving circuits for independently driving said plurality of light sources;

a plurality of collimator lenses for collimating light beams from said plurality of light sources to provide a plurality of substantially parallel beams, respectively;

a plurality of cylindrical lenses for focusing respective light beams emitted from said plurality of collimator lenses only in sub-scanning directions;

a beam splitter for making optical axes of light beams emitted from said cylindrical lenses substantially coincident with each other;

a deflector having a deflection surface near a point at which the light beams emitted from said beam splitter are focused by said cylindrical lenses;

a scanning lens for scanning the light beams deflected by said deflector on a scanned surface;

a synchronizing detector for detecting whether or not said light beams are synchronized with each other when the light beams are scanned, respectively, on said surface;

a sensor unit including a light-receiving sensor and a slit of knife edge shape disposed in front of said light-receiving sensor at a position equivalent to a distance from said beam splitter to said deflection surface;

a control circuit for driving and controlling at least one of said cylindrical lenses by processing an output signal from said sensor unit; and a light path correction mechanism for moving said at least one of said cylindrical lenses on the basis of a control signal from said control circuit, wherein said control circuit causes positions of the sub-scanning directions of said light beams to coincide with each other based on an output signal from said sensor unit by moving at least one of said plurality of cylindrical lenses by a predetermined number of steps.

4. A multiple light beam scanning optical system, comprising:

a plurality of light sources;

driving circuits for independently driving said plurality of light sources;

a plurality of collimator lenses for collimating light beams from said plurality of light sources to provide a plurality of substantially parallel beams, respectively;

a plurality of cylindrical lenses for focusing respective light beams emitted from said plurality of collimator lenses only in sub-scanning directions;

a beam splitter for making optical axes of light beams emitted from said cylindrical lenses substantially coincident with each other;

a deflector having a deflection surface near a point at which the light beams emitted from said beam splitter are focused by said cylindrical lenses;

a scanning lens for scanning the light beams deflected by said deflector on a scanned surface;

a synchronizing detector for detecting whether or not said light beams are synchronized with each other when the light beams are scanned, respectively, on said surface;

a sensor unit including a light-receiving sensor and a slit of knife edge shape disposed in front of said light-receiving sensor at a position equivalent to a distance from said beam splitter to said deflection surface;

a control circuit for driving and controlling at least one of said cylindrical lenses by processing an output signal from said sensor unit; and a light path correction mechanism for moving said at least one of said cylindrical lenses on the basis of a control signal from said control circuit, wherein said control circuit controls said light path correction mechanism such that said light path correction mechanism causes positions of said light beams to coincide with each other in response to said position information of the sub-scanning direction of said light beams sensed by said sensor unit and moves ones of said light beams in a sub-scanning direction thereof relative to a particular one of said light beams.

5. A multiple light beam scanning optical system, comprising:

a plurality of light sources;

driving circuits for independently driving said plurality of light sources;

a plurality of collimator lenses for collimating respective light beams from said plurality of light sources to provide a plurality of substantially parallel light beams;

a plurality of cylindrical lenses for focusing light beams emitted from said plurality of collimator lenses only in sub-scanning directions;

a beam splitter for making optical axes of light beams emitted from said cylindrical lenses substantially coincident with each other;

a deflector having a deflection surface near a point at which the light beams emitted from said beam splitter are focused by said cylindrical lenses;

a scanning lens for scanning the light beams deflected by said deflector on a scanned surface;

a synchronizing detector for detecting whether or not said light beams are synchronized with each other when the light beams are scanned, respectively, on said surface;

a sensor unit including a light-receiving sensor and a slit of knife edge shape disposed in front of said light-receiving sensor at the position equivalent to a distance from said beam splitter to said deflection surface;

a control circuit for driving and controlling at least one of said cylindrical lenses by processing an output signal from said sensor unit;

a light path correction mechanism for moving said at least one of said cylindrical lenses on the basis of a control signal from said control circuit; and a light-shielding plate for shielding a light path from said beam splitter to said deflector when a sub-scanning direction space between said light beams is adjusted in accordance with said output signal of said sensor unit; and a shielding plate movement mechanism for shielding light beams from being irradiated on said sensor unit except when the sub-scanning direction space between said light beams is adjusted in accordance with said output signal of said sensor unit.

6. A multiple light beam scanning optical system, comprising:

a plurality of light sources;

driving circuits for independently driving said plurality of light sources;

a plurality of collimator lenses for collimating respective light beams from said plurality of light sources to provide a plurality of substantially parallel light beams;

a plurality of cylindrical lenses for focusing light beams emitted from said plurality of collimator lenses only in sub-scanning directions;

a beam splitter for making optical axes of light beams emitted from said cylindrical lenses substantially coincident with each other;

a deflector having a deflection surface near a point at which the light beams emitted from said beam splitter are focused by said cylindrical lenses;

a scanning lens for scanning the light beams deflected by said deflector on a scanned surface;

a synchronizing detector for detecting whether or not said light beams are synchronized with each other when the light beams are scanned, respectively, on said surface;

a sensor unit including a light-receiving sensor and a slit of knife edge shape disposed in front of said light-receiving sensor at the position equivalent to a distance from said beam splitter to said deflection surface;

a control circuit for driving and controlling at least one of said cylindrical lenses by processing an output signal from said sensor unit;

a light path correction mechanism for moving said at least one of said cylindrical lenses on the basis of a control signal from said control circuit; and a light-shielding plate for shielding a light path from said beam splitter to said deflector when a sub-scanning direction space between said light beams is adjusted in accordance with said output signal of said sensor unit, wherein said control circuit controls said light path correction mechanism such that said light path correction mechanism causes positions of said light beams to coincide with each other in response to said position information of the sub-scanning direction of said light beams sensed by said sensor unit and moves ones of said light beams in a sub-scanning direction thereof relative to a particular one of said light beams.

7. A multiple light beam scanning optical system, comprising:

a plurality of light sources;

driving circuits for independently driving said plurality of light sources;

a plurality of collimator lenses for collimating respective light beams from said plurality of light sources to provide a plurality of substantially parallel light beams;

a plurality of cylindrical lenses for focusing respective light beams emitted from said collimator lenses only in sub-scanning directions;

a beam splitter for making optical axes of light beams emitted from said cylindrical lenses substantially coincident with each other;

a deflector having a deflection surface near a point at which the light beams emitted from said beam splitter are focused by said cylindrical lenses;

a scanning lens for scanning the light beams deflected by said deflector on a scanned surface;

a synchronizing detector for detecting whether or not said light beams are synchronized with each other when the light beams are scanned, respectively, on said surface;

a sensor unit including a light-receiving sensor and a slit of knife edge shape disposed in front of said light-receiving sensor at a position equivalent to a distance from said beam splitter to said deflection surface;

a control circuit for driving and controlling at least one of said cylindrical lenses by processing an output signal from said sensor unit;

a light path correction mechanism for moving said at least one of said cylindrical lenses on the basis of a control signal from said control circuit; and a light-shielding plate for shielding a light path from said beam splitter to said deflector when a sub-scanning direction space between said light beams is adjusted in accordance with said output signal of said sensor unit; and a shielding plate movement mechanism for shielding light beams from being irradiated on said sensor unit except when the sub-scanning direction space between said light beams is adjusted in accordance with said output signal of said sensor unit.

8. A multiple light beam scanning optical system, comprising:

a plurality of light sources;

driving circuits for independently driving said plurality of light sources;

a plurality of collimator lenses for collimating respective light beams from said plurality of light sources to provide a plurality of substantially parallel light beams;

a plurality of cylindrical lenses for focusing respective light beams emitted from said collimator lenses only in sub-scanning directions;

a beam splitter for making optical axes of light beams emitted from said cylindrical lenses substantially coincident with each other;

a deflector having a deflection surface near a point at which the light beams emitted from said beam splitter are focused by said cylindrical lenses;

a scanning lens for scanning the light beams deflected by said deflector on a scanned surface;

a synchronizing detector for detecting whether or not said light beams are synchronized with each other when the light beams are scanned, respectively, on said surface;

a sensor unit including a light-receiving sensor and a slit of knife edge shape disposed in front of said light-receiving sensor at a position equivalent to a distance from said beam splitter to said deflection surface;

a control circuit for driving and controlling at least one of said cylindrical lenses by processing an output signal from said sensor unit;

a light path correction mechanism for moving said at least one of said cylindrical lenses on the basis of a control signal from said control circuit; and a light-shielding plate for shielding a light path from said beam splitter to said deflector when a sub-scanning direction space between said light beams is adjusted in accordance with said output signal of said sensor unit, wherein said control circuit controls said light path correction mechanism such that said light path correction mechanism causes positions of said light beams to coincide with each other in response to said position information of the sub-scanning direction of said light beams sensed by said sensor unit and moves ones of said light beams in a sub-scanning direction thereof relative to a particular one of said light beams.

9. A multiple light beam scanning optical system, comprising:

a plurality of light sources;

driving circuits for independently driving said plurality of light sources;

a plurality of collimator lenses for collimating respective light beams from said plurality of light sources to provide a plurality of substantially parallel light beams;

a plurality of cylindrical lenses for focusing light beams emitted from said collimator lenses only in sub-scanning directions;

a beam splitter for making optical axes of light beams emitted from said cylindrical lenses substantially coincident with each other;

a deflector having a deflection surface near a point at which the light beams emitted from said beam splitter are focused by said cylindrical lenses;

a scanning lens for scanning the light beams deflected by said deflector on a scanned surface;

a synchronizing detector for detecting whether or not said light beams are synchronized with each other when the beams are scanned, respectively, on said surface;

a sensor unit including a light-receiving sensor and a slit of knife edge shape disposed in front of said light-receiving sensor at a position equivalent to a distance from said beam splitter to said deflection surface;

a control circuit for causing positions of sub-scanning directions of said light beams to coincide with each other on the basis of an output signal from said sensor unit by moving at least one of said plurality of cylindrical lenses by a predetermined number of steps;

a light path correction mechanism for moving said at least one of said cylindrical lenses on the basis of a control signal from said control circuit; and a light-shielding plate for shielding a light path from said beam splitter to said deflector when a particular sub-scanning direction space between said light beams is adjusted in accordance with said output signal of said sensor unit; and a shielding plate movement mechanism for shielding light beams from being irradiated on said sensor unit except when the sub-scanning direction space between said plurality of light beams is adjusted in accordance with said output signal of said sensor unit.

10. A multiple light beam scanning optical system, comprising:

a plurality of light sources;

driving circuits for independently driving said plurality of light sources;

a plurality of collimator lenses for collimating respective light beams from said plurality of light sources to provide a plurality of substantially parallel light beams;

a plurality of cylindrical lenses for focusing light beams emitted from said collimator lenses only in sub-scanning directions;

a beam splitter for making optical axes of light beams emitted from said cylindrical lenses substantially coincident with each other;

a deflector having a deflection surface near a point at which the light beams emitted from said beam splitter are focused by said cylindrical lenses;

a scanning lens for scanning the light beams deflected by said deflector on a scanned surface;

a synchronizing detector for detecting whether or not said light beams are synchronized with each other when the beams are scanned, respectively, on said surface;

a sensor unit including a light-receiving sensor and a slit of knife edge shape disposed in front of said light-receiving sensor at a position equivalent to a distance from said beam splitter to said deflection surface;

a control circuit for causing positions of sub-scanning directions of said light beams to coincide with each other on the basis of an output signal from said sensor unit by moving at least one of said plurality of cylindrical lenses by a predetermined number of steps;

a light path correction mechanism for moving said at least one of said cylindrical lenses on the basis of a control signal from said control circuit; and a light-shielding plate for shielding a light path from said beam splitter to said deflector when a particular sub-scanning direction space between said light beams is adjusted in accordance with said output signal of said sensor unit, wherein said control circuit controls said light path correction mechanism such that said light path correction mechanism causes positions of said light beams to coincide with each other in response to said position information of the sub-scanning direction of said light beams sensed by said sensor unit and moves ones of said light beams in a sub-scanning direction thereof relative to a particular one of said light beams.

* * * * *